Sept. 9, 1947. J. F. SCHAFER 2,427,306
MOWING CUTTER AND SUPPORT
Filed July 22, 1944
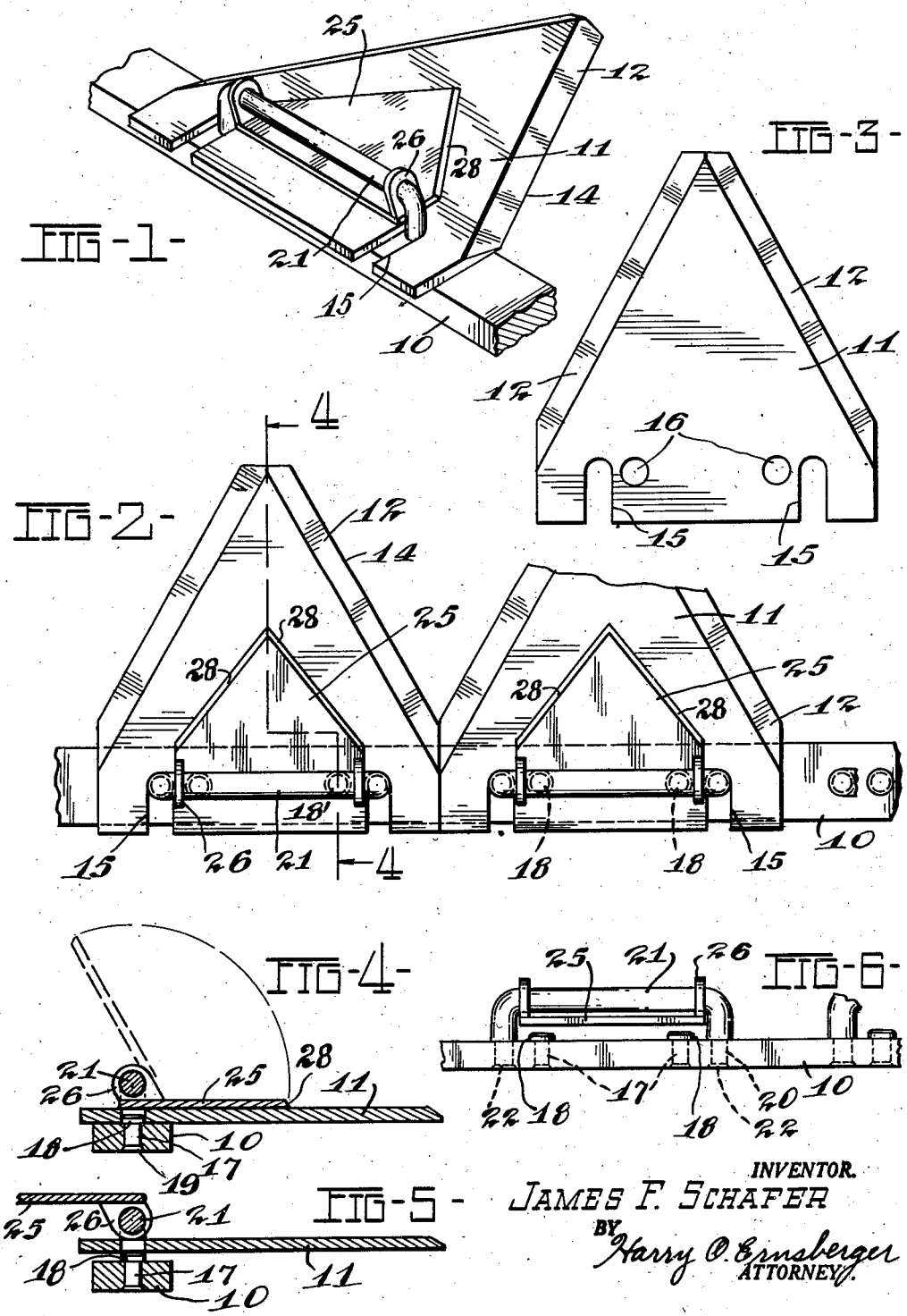
INVENTOR.
JAMES F. SCHAFER
BY
Harry O. Ernsberger
ATTORNEY.

Patented Sept. 9, 1947

2,427,306

UNITED STATES PATENT OFFICE 2,427,306

MOWING CUTTER AND SUPPORT

James F. Schafer, Fort Lauderdale, Fla.; Matilda Brannaman Linthicum, executrix of said James F. Schafer, deceased Application July 22, 1944, Serial No. 546,071

5 Claims. (Cl. 56—300)

This invention relates to cutting devices and more particularly to cutters and supporting means therefor especially adaptable for moving machines.

The invention embraces the provision of independent knives or cutter teeth for a mowing machine in which the individual teeth are selectively removable from the support for purposes of repair or replacement.

The invention provides an arrangement of means for removably mounting a knife or cutter upon a support or cutter bar whereby a knife may be quickly removed and replaced or repaired without the use of special tools.

An object of the invention is the provision of means for interlocking a mowing machine knife with its reciprocable supporting bar and retaining the knife in position by cam means.

Another object is the provision of means for positively positioning a cutter or knife on a support in association with releasable means for locking the cutter in position.

Still another object is the provision of cam means for retaining a removable knife upon a cutter bar in which the cam means in normal position is in close engagement with the cutter and not liable to be dislodged during cutting operations.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is an isometric view of a portion of a cutter support and cutter illustrating a form of the invention;

Figure 2 is a top plan view of a portion of the support, cutter and cutter retaining means;

Figure 3 is a top plan view of a form of cutter per se;

Figure 4 is a sectional view taken substantially on the line 4—4 of Figure 2;

Figure 5 is a view similar to Figure 4 showing the cutter retaining means in released position and the method of removing the cutter;

Figure 6 is a rear elevational view showing the cutter retaining means and support therefor the cutter being removed therefrom;

While I have illustrated a form of the invention as embodied in a cutting means for mowing machines, it is to be understood that I contemplate the use of my invention with any mechanism wherein the same may be found to have utility.

Referring to the drawings in detail, numeral 10 designates a cutter bar or support upon which is mounted a plurality of cutters or knives 11 arranged in contiguous relationship upon the bar 10. In my invention each knife 11 is supported independently of the others and is of a configuration as particularly illustrated in Figure 3. Each knife is generally of V-shape having the converging wall portion beveled as at 12 to provide cutting edges 14. In a mowing machine (not shown) the bar 10 and the knives 11 are reciprocated in a direction longitudinally of the bar causing the knives to pass stationary teeth (not shown) to effect a cutting or shearing of grass, hay or other material to be cut. The rear portion of each knife is formed with a pair of open slots or kerfs 15 and adjacent each slot is a circular opening 16 to accommodate knife positioning means as hereinafter explained.

The support or cutter bar 10 is provided with openings in which are disposed pins 17 having shouldered portions or heads 18 which engage and project from the upper surface of the bar 10. The lower extremities of the pins 17 are swaged as at 19 to frusto-conical configuration to fixedly retain the pins in the bar 10. The bar 10 is formed with openings adjacent each pair of pins 17 to receive tenons 20 formed on the legs of a U-shaped member or cutter retainer supporting means 21, the ends of the tenons 20 being swaged as at 22 to securely fasten the member 21 to the support or bar 10. A member 21 is provided for each knife 11 disposed along the bar 10.

The cutter retaining means is inclusive of a member 25 formed at each side of its rear portion with upwardly extending ears 26, the latter having openings to accommodate the bight or horizontal portion of member 21 and is adapted for pivotal movement thereon. In practice, the member 25 is assembled upon member 21 while the latter is in the form a straight bar, and is subsequently bent to U-shaped configuration with member 25 positioned thereon.

Each knife 11 is normally retained in fixed position upon the bar 10 as illustrated in Figures 1, 2 and 4 with member 25 in engagement with and parallel to the upper surface of the knife. The heads 18 of pins 17 project into the circular openings 16 and the bar 10 and serve to properly position the knife, while the member 25 functions as a cam means to lock the knife to the bar 10 in the manner illustrated in Figure 4.

In the event that one or more of the knives or cutters 11 becomes dull or broken, the same may be quickly and easily removed by swinging the cam or member 25 about its pivotal support as shown in dotted lines in Figure 4. A screw driver or other suitable edged tool may be inserted between the adjacent surfaces of the knife and member 25 in order to effect relative movement of the cam or member 25 to knife releasing position as shown in Figure 5. After member 25 has been swung to the position shown in Figure 5, the knife 11 may be elevated to disengage the knife from the heads of positioning pins 17, the knife removed by forward movement of same relative to the support, a new one quickly inserted, and the cam 25 returned to its normal position to hold the knife to the bar as shown in Figures 1, 2 and 4.

It should be noted that the converging edge walls of member 25 are beveled as at 28 to facilitate movement of the same through the material to be cut, thus minimizing the liability of dislodging the knife retaining cams 25 during mowing or cutting operations.

It is apparent that, within the scope of the invention, modifications and different arrangements may be made other than is herein disclosed, and the present disclosure is illustrative merely, the invention comprehending all variations thereof.

What I claim is:

1. In combination, an elongated supporting bar; a cutter having converging cutting edges mounted upon said bar; a plurality of projections extending from said bar; said cutter having a plurality of openings adapted to register with said projections and adapted to receive the latter for positioning the cutter upon the bar; and a cam means pivotally mounted for movement about an axis parallel to and spaced from said supporting bar for normally securing said cutter in engagement with the bar.

2. In combination, an elongated supporting bar; a V-shaped cutter adapted to be supported upon said bar having converging cutting edges; a pair of projections extending from said bar; said cutter having a pair of openings adapted to accommodate said projections for positioning said cutter upon said bar; a U-shaped member having its leg portions fixedly secured to said bar; said cutter having a pair of slots adapted to accommodate the legs of said U-shaped member; and a cam supported upon the bight portion of said U-shaped member and adapted to secure said cutter in engagement with said bar.

3. In combination a mowing machine cutter including an elongated supporting bar; a plurality of cutting knives adapted to be carried upon said bar; a plurality of U-shaped members carried upon said bar; a plurality of pins carried by said bar and projecting from one side thereof; each of said knives having openings to accommodate the projecting extremities of the pins carried by said bar; a plurality of knife locking members; each of said knife locking members having a body portion and a pair of perforated ears extending from said body portion and journaled for pivotal movement on the bight portions of said U-shaped members; each of said knife locking members being arranged to be swung to a position in which the body portion thereof is parallel to and in contact with the horizontal upper surfaces of said knives for normally holding said knives in operable engagement with said supporting bar.

4. In combination, a mowing machine cutter including an elongated supporting bar; a plurality of individual cutting knives adapted to be carried upon said bar; a plurality of U-shaped members carried upon said bar; the legs of said U-shaped members having reduced tenon portions extending into openings formed in said bar; the extremities of said tenon portions being distorted to securely fix said U-shaped members to said bar; a plurality of pins carried by said bar; said knives having openings to accommodate the pins carried by said bar; a plurality of knife locking members; each of said knife locking members having a V-shaped body portion and pair of perforated ears extending upwardly and journaled for pivotal movement on the bight portion of said U-shaped members; each of said knife locking members being arranged to be swung to a position in which the body portion thereof is parallel to and in contact with the horizontal upper surfaces of said knives for normally holding said knives in operable engagement with said supporting bar.

5. In combination a mowing machine cutter including an elongated supporting bar; a plurality of individual cutting knives adapted to be carried upon said bar; a plurality of U-shaped members carried upon said bar and arranged with the bight portions thereof parallel to the bar; the legs of said U-shaped members having reduced tenon portions extending into openings formed in said bar; the extremities of said tenon portions being distorted to securely fix said U-shaped members to said bar; a plurality of headed pins carried by said bar each of said knives having openings to accommodate the heads of the pins carried by said bar; a plurality of knife locking members each having a V-shaped body portion; each of said knife locking members having a pair of laterally extending perforated ears journaled for pivotal movement on the bight portion of said U-shaped members; each of said knife locking members being arranged to be swung to a position in which the V-shaped body portion is parallel to and in contact with the horizontal upper surfaces of said knives for normally holding said knives in operable engagement with said supporting bar; said knife locking members having converging beveled upper edges.

JAMES F. SCHAFER.

REFERENCES CITED

The following references are of record in the file of this patent:

UNITED STATES PATENTS

| Number | Name | Date |
| --- | --- | --- |
| 536,464 | Friesz | Mar. 26, 1895 |
| 1,113,944 | Auble | Oct. 20, 1914 |
| 356,574 | Decker | Jan. 25, 1887 |
| 964,252 | Hebden | July 12, 1910 |
| 1,214,345 | Melby | Jan. 30, 1917 |
| 1,384,933 | Whitmoyer | July 19, 1921 |
| 2,332,840 | Boyer | Oct. 26, 1943 |
| 392,202 | Haberthur et al. | Nov. 6, 1888 |
| 1,312,496 | Anderson et al. | Aug. 5, 1919 |